Figure 1:
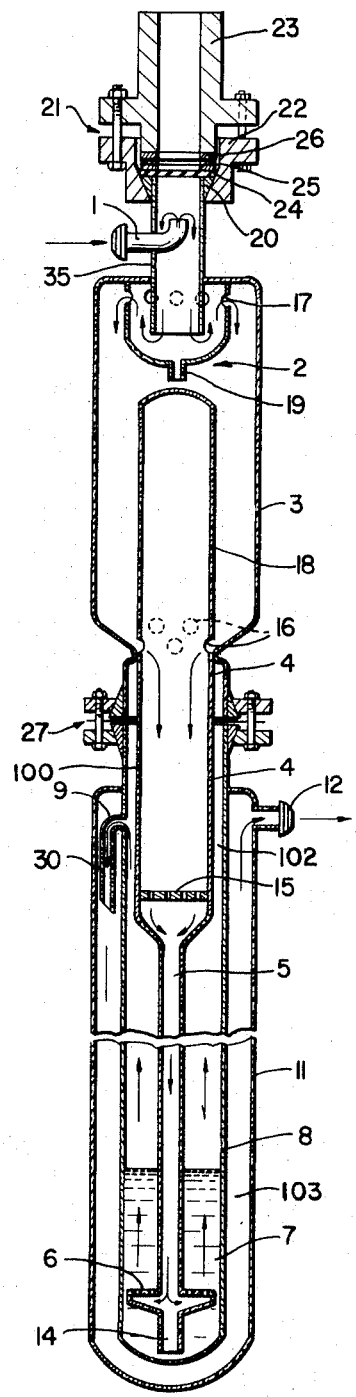

United States Patent [19]
Trefzer

[11] 3,709,471
[45] Jan. 9, 1973

[54] GAS WASHING BOTTLE

[75] Inventor: Robert Trefzer, Basel, Switzerland

[73] Assignee: Ciba-Geigy AG, Basel, Switzerland

[22] Filed: July 22, 1969

[21] Appl. No.: 843,357

[30] Foreign Application Priority Data

July 25, 1968 Switzerland..................11215/68

[52] U.S. Cl....................................261/124, 23/292
[51] Int. Cl. .................................................B01f 3/04
[58] Field of Search ........261/121, 114, 124; 23/292, 23/261, 252, 253, 168

[56] References Cited

UNITED STATES PATENTS

| | | | |
|---|---|---|---|
| 1,354,736 | 10/1920 | Fleming | 23/292 |
| 1,614,313 | 1/1927 | Monaghan | 23/261 X |
| 2,014,823 | 9/1935 | Tramm | 23/253 |
| 2,408,721 | 10/1946 | Altsheler | 23/252 |
| 3,242,071 | 3/1966 | Walker | 261/124 X |
| 3,348,814 | 10/1967 | Shaw | 23/252 X |
| 3,348,827 | 10/1967 | Trefzer | 23/292 |
| 1,615,912 | 2/1927 | O'Neill | 261/19 X |
| 2,156,313 | 5/1939 | Schwab | 206/63.2 A |
| 3,031,685 | 5/1962 | Baumann | 4/180 |
| 3,103,471 | 9/1963 | Asami | 23/292 X |

FOREIGN PATENTS OR APPLICATIONS 880,227 12/1942 France ...............................23/252

OTHER PUBLICATIONS

Laboratory Apparatus & Supplies, Eimer & Amend, Copyright 1936, New York, N.Y., QD53E34 1936 C-3, page 131.

*Primary Examiner*—Tim R. Miles
*Attorney*—Wenderoth, Lind & Ponack

[57] ABSTRACT

A gas washing bottle. The bottle has a lower vessel and an upper vessel having first and second portions, the first portion extending into the lower vessel to provide an enclosed first space between the first portion of the upper vessel and the lower vessel. A first pipe extends from the first portion of the upper vessel and terminates adjacent the base of the lower vessel. A first barrier vessel surrounds at least part of the lower vessel to provide an enclosed second space between the first barrier vessel and the part of said lower vessel. A first communication means provides communication between the lower vessel and the enclosed second space, this communication means being positioned on the lower vessel remote from the termination of the first pipe. The first barrier vessel has a first gas connection remote from the termination of the first pipe in said lower vessel. A second barrier vessel is provided and communication is provided between the second barrier vessel and the interior of the upper vessel. A second gas connection communicates with the second barrier vessel at a position remote from the first communication means.

13 Claims, 3 Drawing Figures

INVENTOR
ROBERT TREFZER

BY Wenderoth, Lind & Ponack
ATTORNEYS 3,709,471

GAS WASHING BOTTLE

The invention relates to a gas washing bottle.

In one form the invention comprises two coaxially aligned vessels which communicate through a pipe let into the bottom of the inner vessel and ending inside the outer vessel near the bottom thereof, the inner vessel communicating with a first gas connection and the outer vessel being coaxially located inside a barrier vessel provided with a second gas connection and communicating with said barrier vessel through at least one opening in the upper part of said outer vessel. A second barrier vessel is provided which allows communication between said first gas connection and said inner vessel, and which is likewise coaxially aligned with the inner vessel, communication between said second barrier vessel and said inner vessel being provided in the upper part of said inner vessel and at least above the highest level of the washing liquid in said inner vessel during operation.

Compared with the safety gas washing bottle described in Swiss Patent specification No. 425,278 the proposed safety gas washing bottle has the major advantage of being capable of operating in either direction of gas flow, in other words the gas may enter the bottle either through the first or the second gas connection. When the gas enters the first gas connection the washing and barrier liquid is in the inner vessel, whereas when the gas enters through the second gas connection the washing liquid is completely or partly displaced into the upper vessel which thus constitutes an alternative gas washing vessel. Provided the vessels are of appropriate capacities the proposed construction of the gas washing bottle affords improved operating safety against the discharge of liquid from the bottle into either of the gas connections irrespectively of the direction of gas flow.

Figure 2:
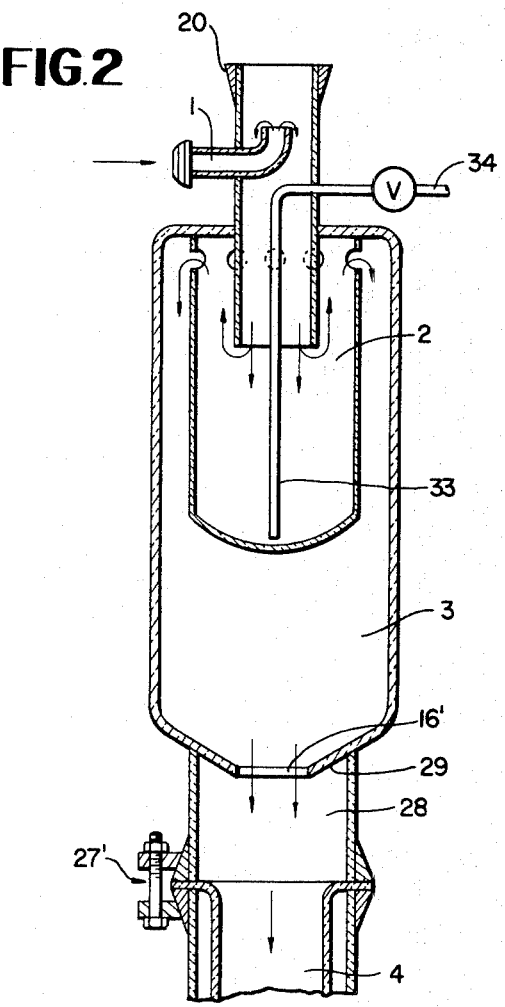
Figure 3:
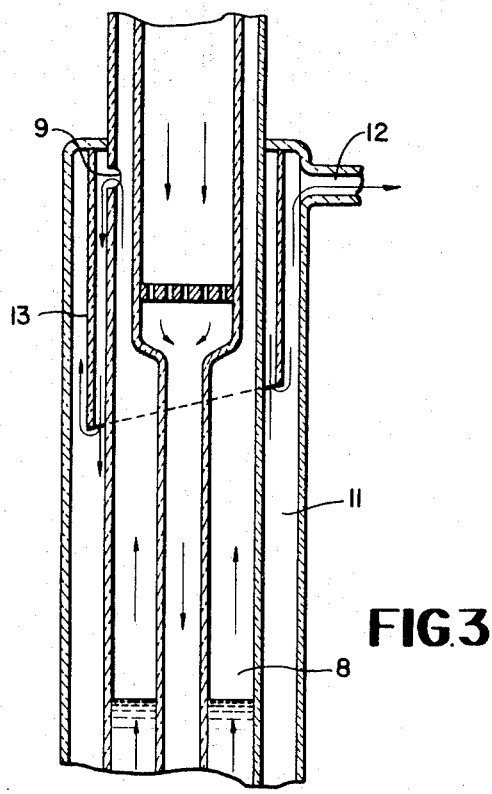

The invention will be hereinafter more particularly described with reference to embodiments of which axial sections are shown in the drawings in which:

FIG. 1 shows the general construction of one embodiment of a bottle in accordance with the present invention, whereas, FIGS. 2 and 3 illustrate modifications of two features of the embodiment shown in FIG. 1.

The illustrated gas washing bottle is made of transparent glass. However, other suitable materials, such as plastics, could be used as an alternative to glass.

The illustrated gas washing bottle comprises two coaxially aligned washing vessels 4 and 8 which are in communication through a pipe 5 let into the bottom of the upper vessel 4 and ending near the bottom of the lower vessel 8. Vessel 4 has an upper section 18 and a lower section 100, the lower section 100 extending into vessel 8 to provide an enclosed first space 102 between portion 100 and vessel 8. The lower washing vessel 8 is enclosed by a first barrier for the washing liquid comprising a first barrier vessel 11 and providing a second enclosed space 103 between vessels 8 and 11. At least one opening 9 in the upper part of the washing vessel 8 communicates with space 103. The barrier vessel 11 is provided with a connection 12 for the admission or discharge of a gas. In relation to the opening 9 this connection 12 is angularly offset on the periphery of the barrier vessel 11. In the illustrated embodiment this angle is 180°. The upper washing vessel 4 communicates through a second barrier for the washing liquid comprising a second barrier vessel 3 and an anti-spray labyrinth with another gas connection 1. The communicating openings between the washing vessel 4 and the barrier vessel 3 are near the bottom of the latter vessel so that any liquid forced or drawn into the barrier vessel can flow back by gravity into the washing vessels 4 and 8. In order to facilitate flowback, the barrier vessel 3 has a funnel-shaped portion adjacent the upper end of the lower vessel 8. The bottom end of the pipe 5 connecting the upper and lower washing vessels 4 and 8 forms a distributor 6 resembling a rose with upwardly directed spray orifices. A short length of pipe 14 adjoins the distributor to permit pressure equalization in the event of the orifices in the rose being choked. A perforated plate 15 is inserted in the bottom part of the upper washing vessel 4. The gas connection 1 opens into a tube 35 of which one end descends into the anti-spray labyrinth 2, whereas the other end is closed by a safety valve 21 which in the illustrated embodiment is constituted by a shear plate 25 held on the flange 20 of the tube 35 by fixing elements 22 and 23 with the interposition of a sealing ring 24 and a sharp-edged ring 26. The inner end of the gas connection 1 is preferably arranged to point towards the safety valve.

With reference to FIG. 1 the upper washing vessel 4 is provided with peripheral holes 16 for communication with the enveloping barrier vessel 3, the perforated part of the washing vessel 4 being just inside the funnel-shaped portion of the barrier vessel 3. Preferably, and as illustrated, the washing vessel 4 extends beyond the perforated zone 16 into the barrier vessel 3, the extension forming a collecting chamber 18 for any liquid that may be forced upwards out of the washing vessels 4 and 8.

FIG. 2 shows a modification to the upper vessel 4 and the barrier vessel 3 to allow communication therebetween by means of a central hole 16'. The funnel-shaped portion 29 of the barrier vessel projects inwardly into the vessel 4 and thus forming an internal obstruction. If desired, a perforated plate may be additionally inserted into the hole 16'.

In FIG. 1 the anti-spray labyrinth 2 is provided with a return pipe 19, whereas in the modification illustrated in FIG. 2 this is replaced by means 33-34 for withdrawing liquid by suction.

In FIG. 1 the communicating opening 9 in the lower washing vessel is provided with an elbow pipe 30, whereas in FIG. 3 the elbow pipe is replaced by a cylinder 13 to form a labyrinth between a plurality of communicating openings 9 in the lower washing vessel 8 and the gas connection 12 of the barrier vessel 11.

The proposed safety gas washing bottle may be of integral or composite construction. The bottle in FIG. 1 is composed of two parts, the bottom part comprising the two vessels 8 and 11 and the two parts being connected together by a flat ground screwed joint 27. In FIG. 2 the bottle consists of three parts, the first part comprising the upper barrier vessel 3, the anti-spray labyrinth 2 and the gas connection 1 as well as part 28 of the upper gas washing vessel 4, the second part comprising the upper gas washing vessel 4 and the pipe 5 (FIG. 1) and the third part consisting of the lower gas washing vessel 8 (FIG. 1) and the bottom barrier vessel 11 (FIG. 1), these three parts being held together by a flat ground screwed joint 27'.

The manner in which the safety gas washing bottles according to FIGS. 1 to 3 function will now be described in somewhat greater detail.

The gas that is to be washed is introduced through the connection 1 and flows as indicated in the drawings by arrows through the upper anti-spray labyrinth 2, the upper barrier vessel 3, the upper gas washing vessel 4 and the communi-cating pipe 5 to the gas distributor 6, whence it bubbles in fine division through the gas washing liquid 7 in the lower gas washing vessel 8. The washed gas then flows through the opening 9 into the lower barrier vessel 11 and thence out through the connection 12 for instance into the gas admission pipe of some other apparatus.

The opening 9, i.e. the pipe elbow 30 FIG. 1 or the bottom anti- spray labyrinth 13 (FIG.3) are so contrived that entrained droplets of washing liquid will be retained and collected in the lower barrier vessel 11.

When the lower gas distributor 6 becomes increasingly fouled or choked, the gas can flow through the pressure equalizing pipe 14 into the lower gas washing vessel 8. It can be readily visually observed when this occurs.

If the direction of gas flow is reversed, as may occur when the gas washer is installed in the venting pipes of tank installations, the gas may enter the lower barrier vessel 11 through the connection at 12 and thence flow through the openings 9 into the lower gas washing vessel 8. Here the gas will displace the gas washing liquid 7 through the lower gas distributor 6, the pressure balancing pipe 14 and the communicating pipe 5 into the upper gas washing vessel 4. The following gas, finely divided by the gas distributor 15, then enters the washing liquid in the upper gas washing vessel 4. The unwashed gas flows through the transfer openings 16 into the upper barrier vessel 3 and thence through the openings 17 in the anti-spray labyrinth 2 into the outlet connection 1 through which the gas leaves the safety gas washer. When operated in this way the direction of the arrows shown in the drawing must be reversed.

Droplets of washing liquid that have been separated in the upper anti-spray labyrinth 2 flow back through the return pipe 19 and re-enter the upper gas washing vessel 4 after having passed through the upper barrier vessel 3 and the transfer openings 16.

The shear plate 25 of the over-pressure safety valve is preferably so designed that it will fracture at a maximum pressure of 1 atg and thus open the valve. Since the inside opening of the connecting pipe 1 points towards the valve and the shear plate 25, the safety gas washer is substantially protected from pressure surges that may be caused by faulty manipulation of valves on the gas cylinders.

Should a low pressure occur at the gas connection 1 or a high pressure at the gas connection 12, the liquid 7 in the lower or upper gas washing chamber 8 or 4 of the gas washer will be forced into the collecting chamber 18 which has at least a capacity large enough to receive the entire volume of gas washing liquid in the washer. When the pressure differential at the gas connections equalize a little gas washing liquid can enter the upper barrier vessel 3 through the transfer openings 16, only a few splashes reaching the upper anti-spray labyrinth 2. These are separated from the gas and flow back through the return pipe 19 into the upper barrier vessel 3.

The washing liquid is prevented from exiting from the gas connection 12 of the lower gas washing vessel 8 by the elbow pipe 30 (FIG. 1) or by the lower anti-spray labyrinth 13 (FIG. 3) and by the lower barrier vessel 11 having a capacity equal to at least four times the volume of the gas washing liquid. Likewise the washing liquid is prevented from exiting from the gas connection 1 of the upper gas washing vessel 4 by the upper barrier vessel 3 also having a capacity equal to four times the volume of the gas washing liquid and by the upper anti-spray labyrinth 2. Even a low or high pressure spontaneously appearing on the gas entry side (1) or on the gas outlet side (12) cannot therefore force or draw the gas washing liquid 7, which may be say concentrated sulphuric acid, out of the safety gas washer. From the point of view of operating safety this is a considerable asset.

The proposed safety gas washer can be produced and used in different sizes.

I claim:

1. A reversible gas washing bottle for washing gas by means of washing liquid comprising a lower vessel, an upper vessel having lower and upper portions, the lower portion extending into said lower vessel to provide an enclosed first space between said lower portion of the upper vessel and said lower vessel, a first pipe extending from said lower portion of the upper vessel to terminate adjacent the base of said lower vessel, a first barrier to the escape of said washing liquid constituted by a first barrier vessel surrounding at least part of said lower vessel to provide an enclosed second space between said first barrier vessel and said part of said lower vessel, first communication means providing communication between the lower vessel and said enclosed second space, said first communication means being positioned on said lower vessel remote from the termination of said first pipe, said first barrier vessel having a first gas connection remote from the termination of said first pipe in said lower vessel, a second barrier to the escape of said washing liquid constituted by a second barrier vessel, second communication means providing communication between said second barrier vessel and the interior of said upper vessel, and a second gas connection communicating with said second barrier vessel at a position remote from said second communication means, whereby when said gas enters said first gas connection it is washed by said washing liquid in said upper vessel, and when said gas enters said second gas connection it is washed by said washing liquid in said lower vessel.

2. A gas washing bottle according to claim 1, in which said second barrier vessel surrounds at least part of said upper portion of the upper vessel extending from said lower vessel to provide an enclosed third space between said second barrier vessel and upper portion of said upper vessel.

3. A gas washing bottle according to claim 1, wherein said first pipe terminates in a rose shaped structure having apertures in the surface thereof facing away from said base of said lower vessel, and further comprising an extension tube extending from said rose shaped structure toward said base of said lower vessel.

4. A gas washing bottle according to claim 1 including a perforated plate positioned within said upper vessel adjacent the position at which said first pipe extends from said lower portion so that gas entering the upper vessel first passes through said perforated plate and then exits from said upper vessel through said first pipe into the lower vessel.

5. A gas washing bottle according to claim 4, including an anti-spray labyrinth arranged between said second gas connection and the interior of said second barrier vessel.

6. A gas washing bottle according to claim 1, in which all said vessels are cylindrical, and said first means for providing a communication between the lower vessel and said enclosed second space comprises a second pipe extending from said lower vessel and bent so that the termination of said second pipe faces the base of said lower vessel.

7. A gas washing bottle according to claim 6, including an anti-spray labyrinth arranged between said second gas connection and the interior of said second barrier vessel, a pressure relief valve coupled to said second gas connection for venting said enclosed second space to the atmosphere, a perforated plate positioned within said upper vessel adjacent the position at which said first pipe extends from said lower portion, a rose shaped structure coupled to the extremity of said first pipe and having apertures therein facing away from said base of said lower vessel and an extension tube coupled to said rose shaped structure and terminating adjacent said base of said lower vessel.

8. A gas washing bottle according to claim 7 in which the second barrier vessel is formed to provide at one end thereof a funnel-shaped portion defining an aperture to receive said upper portion of the upper vessel, said funnel-shaped portion being sealed to said upper portion of the upper vessel to provide a gas and fluid-tight joint therewith.

9. A gas washing bottle according to claim 8, in which said upper portion of said upper vessel is shaped to define a plurality of apertures adjacent said funnel-shaped portion of said second barrier vessel to provide said second communication means.

10. A gas washing bottle according to claim 1, in which the second barrier vessel is formed to provide at one end thereof a funnel-shaped portion defining an aperture, said aperture providing said second communication means.

11. A gas washing bottle according to claim 10, in which said lower portion of said upper vessel is formed to define a plurality of apertures forming said first communication means, said gas washing bottle further including an anti-spray labyrinth located within said enclosed second space and opposite said plurality of apertures.

12. A gas washing bottle according to claim 11, including a second anti-spray labyrinth between said second gas connection and the interior of said second barrier vessel.

13. A gas washing bottle according to claim 12, in which said second anti-spray labyrinth includes a syphon pipe.

* * * * *